(12) United States Patent
Szczepanek

(10) Patent No.: US 8,485,545 B2
(45) Date of Patent: Jul. 16, 2013

(54) HITCH

(75) Inventor: Udo Szczepanek, Eichenau (DE)

(73) Assignee: Jost-Werke GmbH, Neu-Isenburg (DE)

( * ) Notice: Subject to any disclaimer, the term of this patent is extended or adjusted under 35 U.S.C. 154(b) by 103 days.

(21) Appl. No.: 12/986,328

(22) Filed: Jan. 7, 2011

(65) Prior Publication Data

US 2011/0227316 A1  Sep. 22, 2011

(30) Foreign Application Priority Data

Jan. 11, 2010  (DE) .......................... 10 2010 000 786

(51) Int. Cl.
*B60D 1/04* (2006.01)
(52) U.S. Cl.
USPC ........... 280/508; 280/504; 280/509; 280/512; 280/510; 280/478.1; 280/477; 280/479.3
(58) Field of Classification Search
USPC ................. 280/508, 504, 509, 512, 510, 514, 280/478.1, 477, 479.3
See application file for complete search history.

(56) References Cited

U.S. PATENT DOCUMENTS

| | | | | |
|---|---|---|---|---|
| 5,887,885 | A * | 3/1999 | Byers et al. .................... | 280/512 |
| 6,467,793 | B2 * | 10/2002 | Putnam .......................... | 280/508 |
| 2005/0230935 | A1 | 10/2005 | Sauermann | |
| 2012/0098236 | A1 * | 4/2012 | Works et al. .................. | 280/507 |

FOREIGN PATENT DOCUMENTS

| | | |
|---|---|---|
| DE | 9113527 | 2/1992 |
| DE | 20002819 | 5/2000 |
| DE | 102006011676 | 9/2007 |
| EP | 0983880 | 3/2000 |
| EP | 1138529 | 10/2001 |
| EP | 1586469 | 10/2005 |
| FR | 2925396 | 6/2009 |

OTHER PUBLICATIONS

European Search Report dated Jun. 1, 2011 in European Patent Application No. 11150562.4-1268.

* cited by examiner

*Primary Examiner* — Tashiana Adams
*Assistant Examiner* — Marlon Arce
(74) *Attorney, Agent, or Firm* — Plumsea Law Group, LLC

(57) ABSTRACT

The invention refers to a trailer coupling (10) for a towing vehicle (26), comprising a base body (12), a coupling unit (14) with a coupling element (16), that works with a counter-coupling element (18) of a trailing towing vehicle (22), whereby the coupling unit (14) relative to the base body (12) is adjusted between a coupling position and a release position, and a securing device (40), with a securing element (42), that can be adjusted between a securing position and a release position, whereby, in its securing position, it secures the coupling unit (14) in its coupling position. According to the invention, the securing element (42), in its release position, allows a transfer of the coupling unit (14) from its coupling position into its release position, and if the securing element (42) is pivoted by the coupling unit (14) in the course of its movement from the release position and into a coupling preparatory position, and then goes, when the coupling unit (14) has reached the coupling position, by itself into the securing position.

24 Claims, 9 Drawing Sheets

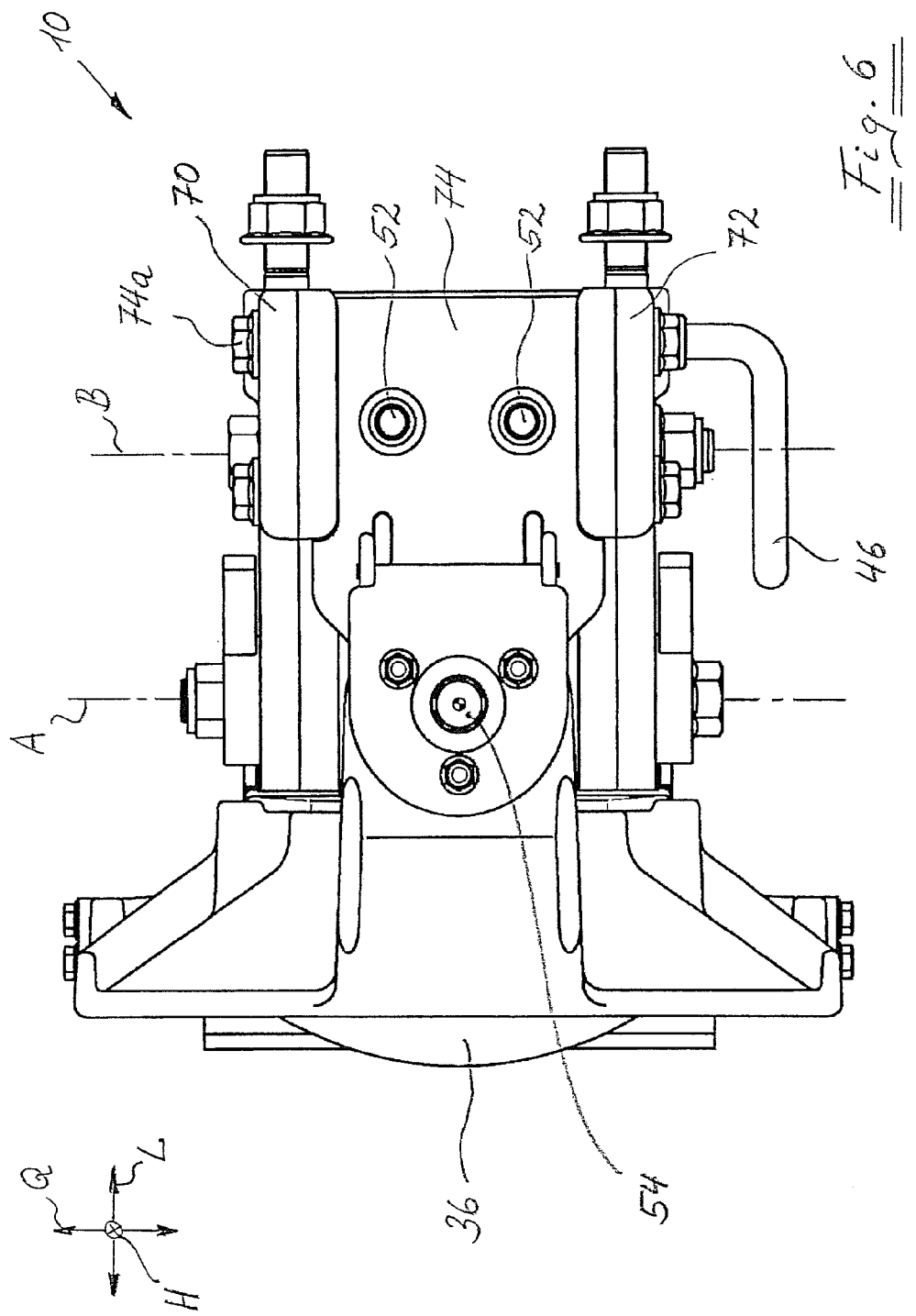

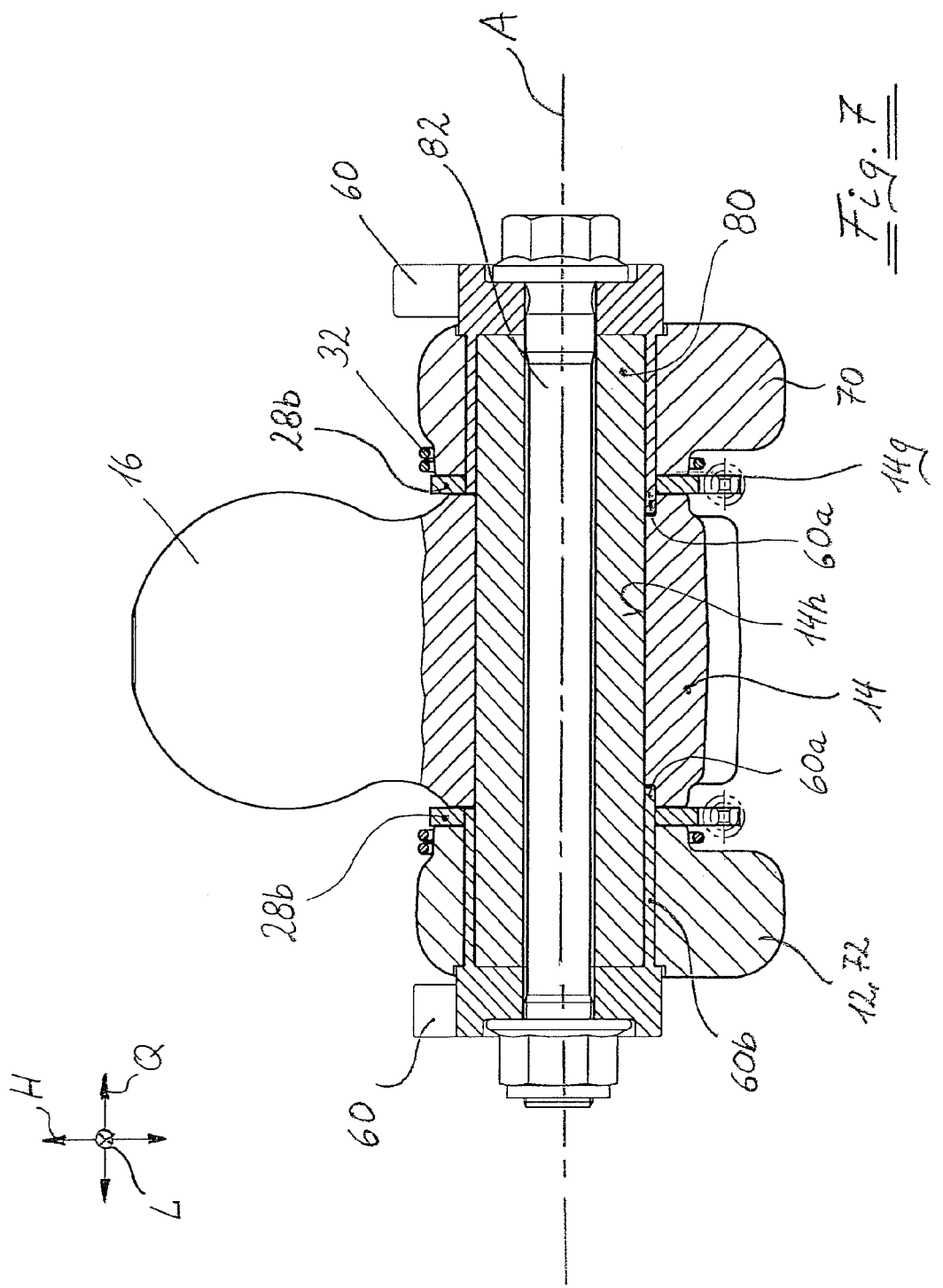

HITCH

Figure 1:
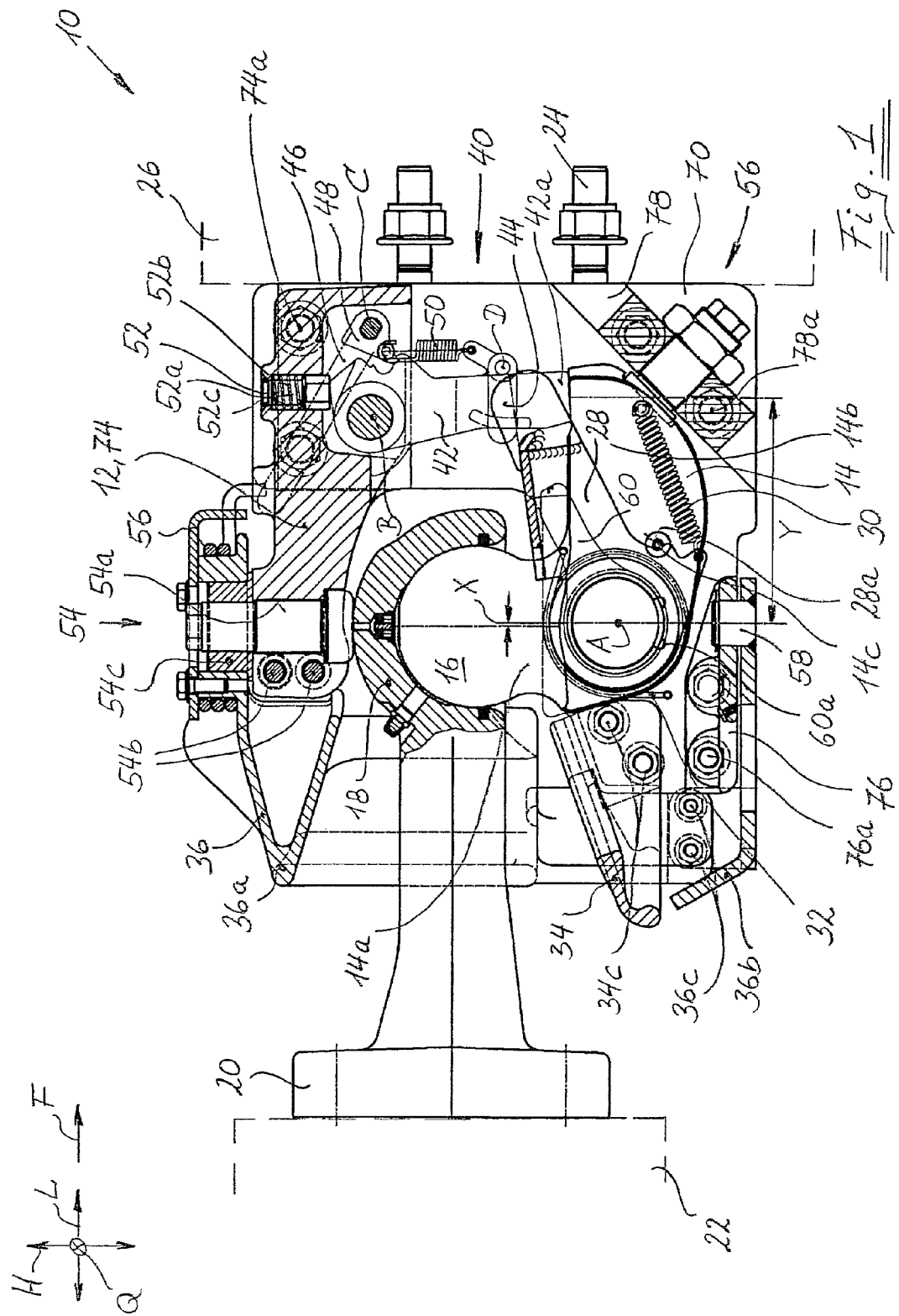

The invention refers to a tow coupling for a towing vehicle, comprising a base body, a coupling unit with a coupling element that is designed to work with a counter-coupling element of a trailing vehicle, whereby the coupling element can be adjusted relatively to the base body between a coupling position and a release position, and a securing device with a securing element, that is adjustable between a securing position and a release position, whereby, in its securing position, it secures the coupling unit in its coupling position.

It should be pointed out at this point that, within the context of this invention, a "position" means a stable position, which a body can take on, and in which it remains, until moved from an external event or influence, which removes it from that stable position. A simple spring-loaded plunger pin, which, for example, is known in EP 1 586 469 A1, has, according to that definition, a securing position, in which the coupling unit can be secured in its coupling position, but no release position, in which a transition of the coupling unit from its coupling position into its release position is allowed. To be more specific, it would, after being retracted, immediately return under the influence of the spring tension into the resting recess of the coupling unit, and would thus prevent the transition of the coupling unit from its coupling position to its release position.

A tow coupling of that genus is for example known from DE 10 2006 011 676. In that type of tow coupling, when coupling a trailing vehicle, the counter-coupling element comes in direct contact with a component of the securing device, to cause the transition of the coupling element from the release position into the coupling position. Because the position and the orientation of the counter-coupling element, relative to the tow coupling and thus to the securing device depends, on the one hand, on the type of trailing vehicle, and on the other, on its orientation relative to the towing vehicle, in practice, coupling processes can occur, in which the counter-coupling element is not in position to trigger the securing device, in an orderly manner.

With that context, it is the task of this invention to enhance a tow coupling of the type described at the beginning of this document, in such a way that the reliability of the tow coupling procedure is further strengthened.

That task is accomplished by means of a tow coupling of the type mentioned at the beginning, in which the securing element, in its release position, allows a transition of the coupling element from its coupling position into its release position, and in which the securing element, through the coupling element, in the process of its movement from the release position into the coupling position, is deflected from the release position, and is transported in a securing position preparatory condition, and then, when the coupling unit has reached the coupling position, goes over on its own into the securing position. According to the invention, the securing device is triggered by an element belonging to the tow coupling, specifically the coupling unit, which is guided in the base body of the tow coupling securely, and thus follows a pre-defined and reliably reproducible movement path.

A constructively simple, but in its function effective design of the securing device can be attained in that, on the securing element, a triggering element is moveably attached, which is pre-tensioned in a contact position, whereby the triggering element of the coupling unit, in its movement from the coupling position into the release position, leaving the securing element in its release position, is deflected out of the contact position, while, in a movement of the coupling unit from its release position into its coupling position, relative to the securing element, it remains in the contact position, and it transfers the securing element into the securing position preparatory condition. A triggering element is also provided, for the tow couplings that are known. However, it is moveably supported on the base body of the tow coupling, and thus cannot have such a direct effect on the securing catch, as a triggering element that is moveably supported on the securing element.

As generally known, it is also advantageous for the tow coupling according to the present invention, when the securing device further has a locking element that can be adjusted between a locked position, and an unlocked position, whereby the locking element in its locking position holds the securing element in its securing position, and when adjusted into the unlocked position, transfers the securing element into its release position. A locking element of that kind can, in particular during driving operation, ensure that the securing element does not move unintentionally and independently, out of its securing position. As part of that, the locking element can be caught in its unlocked position on the securing element, whereby that catching can be released preferably during the transition of the securing element from its release position into the securing position preparatory condition.

The operational security of the tow coupling can be further increased, in that the locking element is pre-tensioned in its locking position.

Independent of whether the locking element is adjusted manually or using pre-tensioning, into the locking position, the operational security of the tow coupling can be increased, in that the locking element in its adjustment into the locking position, transfers the securing element into its securing position.

For the adjustment of the locking element from the locking position into the unlocking position, appropriate (mechanical) drive means can be provided. Those drive means can for example be in the form of a manual control lever, on whose swivel axis the locking element is affixed, in a manner that is torque-free.

An additional simplification of the constructive setup of the tow coupling that is the subject of the invention can be attained in that a pre-tensioning device, preferably a pre-tensioned spring, is provided, which has at least two of the following functions, and preferably all of these functions:

a) pre-tensioning the triggering element in its contact position
b) pre-tensioning the locking element in its locking position, and
c) Securing the meshing of locking element and securing element.

An additional simplification of the constructive setup of the tow coupling of the invention can also be attained, in that the securing element is rotatably supported on the base body, and/or that the triggering element is rotatably supported on the securing element, and/or that the locking element is rotatably supported on the base body.

In order to be able to provide reliable information on the operational condition of the tow coupling to the operating personnel, it is suggested that a display device by provided, which displays whether the securing element is in the securing position. As part of that, the display device can comprise, for example, an indicating pin, which, through the securing element, can be deflected from a position in which it shows that the securing element is in the securing position. In addition, a sensor unit can be assigned to the display device, for example its indicating pin, whereby the output signal of the sensor unit, for example, for remote display purposes of the position of the securing device, can be used.

To increase safety, the tow coupling which is the subject of the invention can have two redundant securing devices. Although that is preferred, the two securing devices do not have to be completely separated from each other. It is possible that the locking element is assigned to the securing elements of both securing devices, commonly.

When, in the following description, or existing description, orientation information and directions are provided, for example, "vertical", "horizontal", "up", "down", "front", "back", "right", "left", etc., those refer to the normal operating condition of the tow coupling, in which it is mounted on a towing vehicle, whereby "front" is the usual direction of travel of the towing vehicle.

Figure 2:
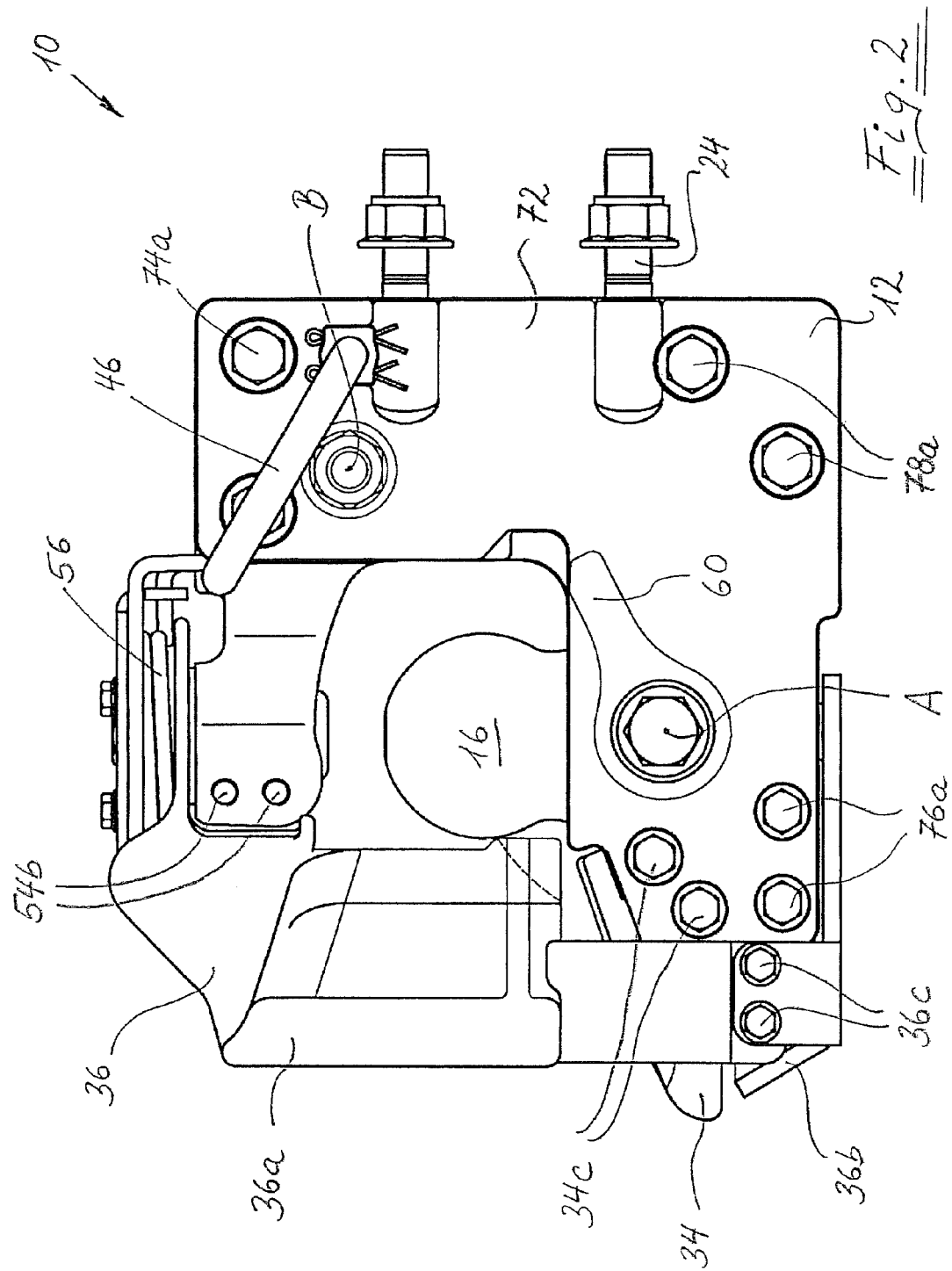
Figure 3:
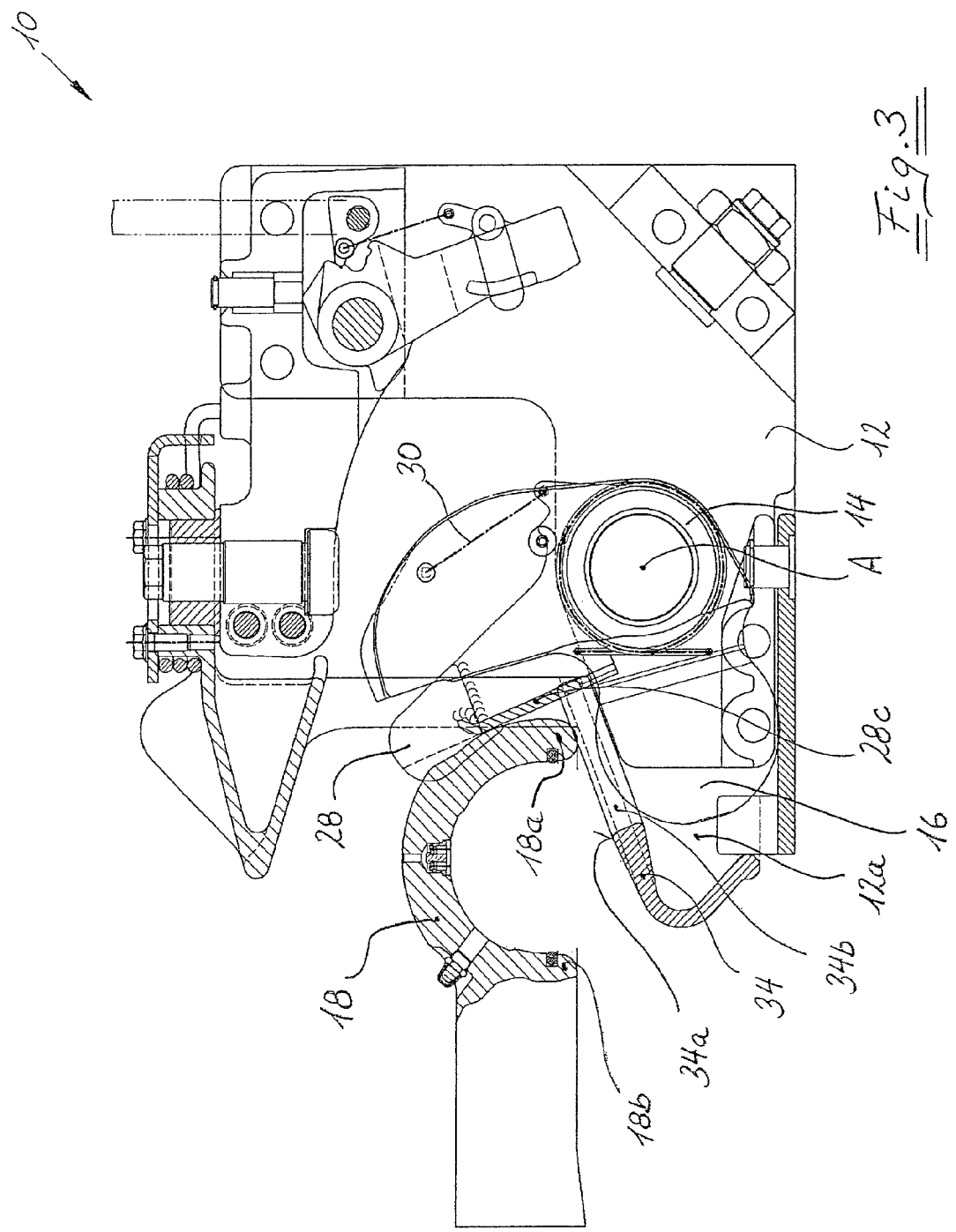
Figure 4:
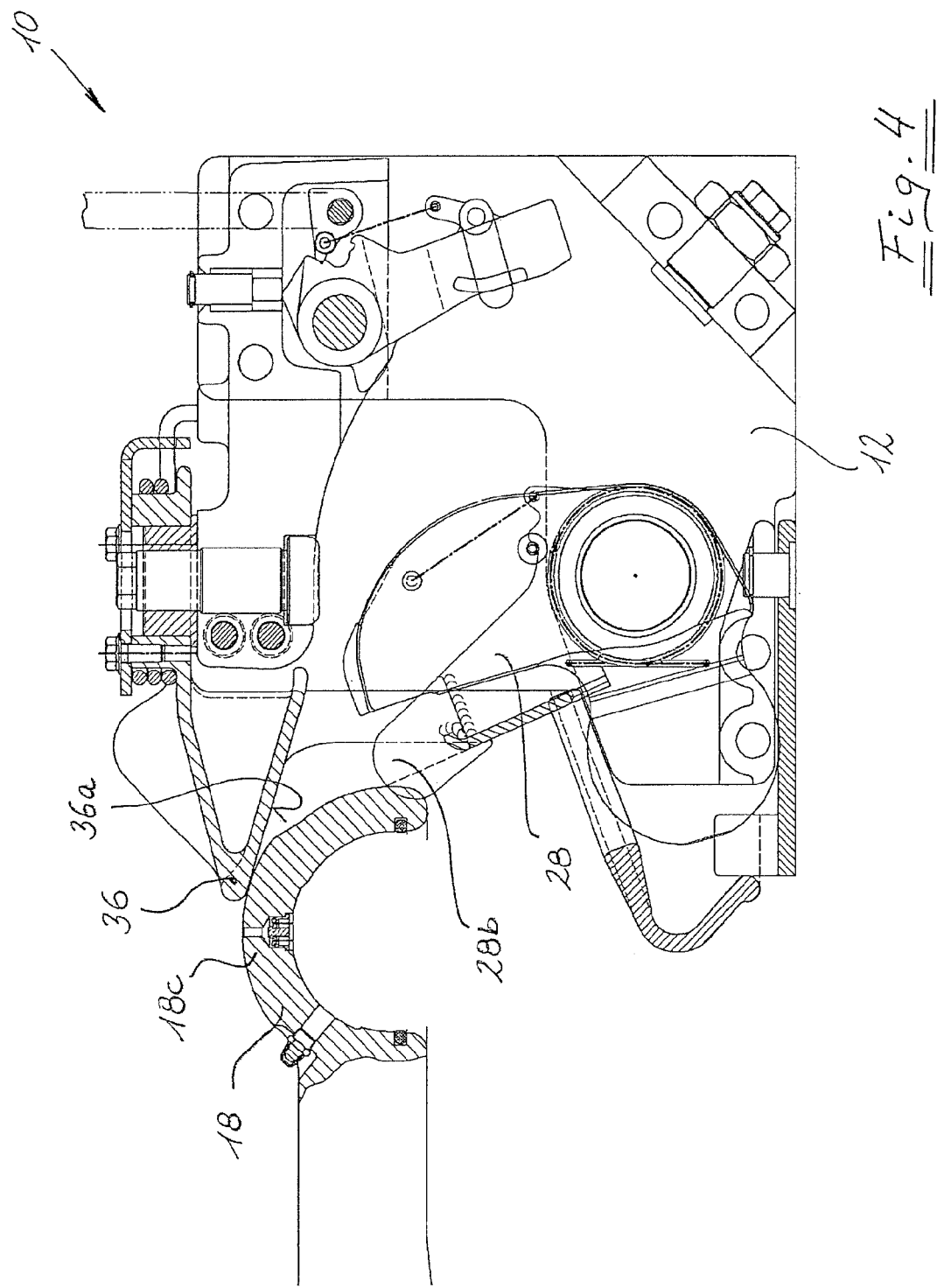
Figure 5:
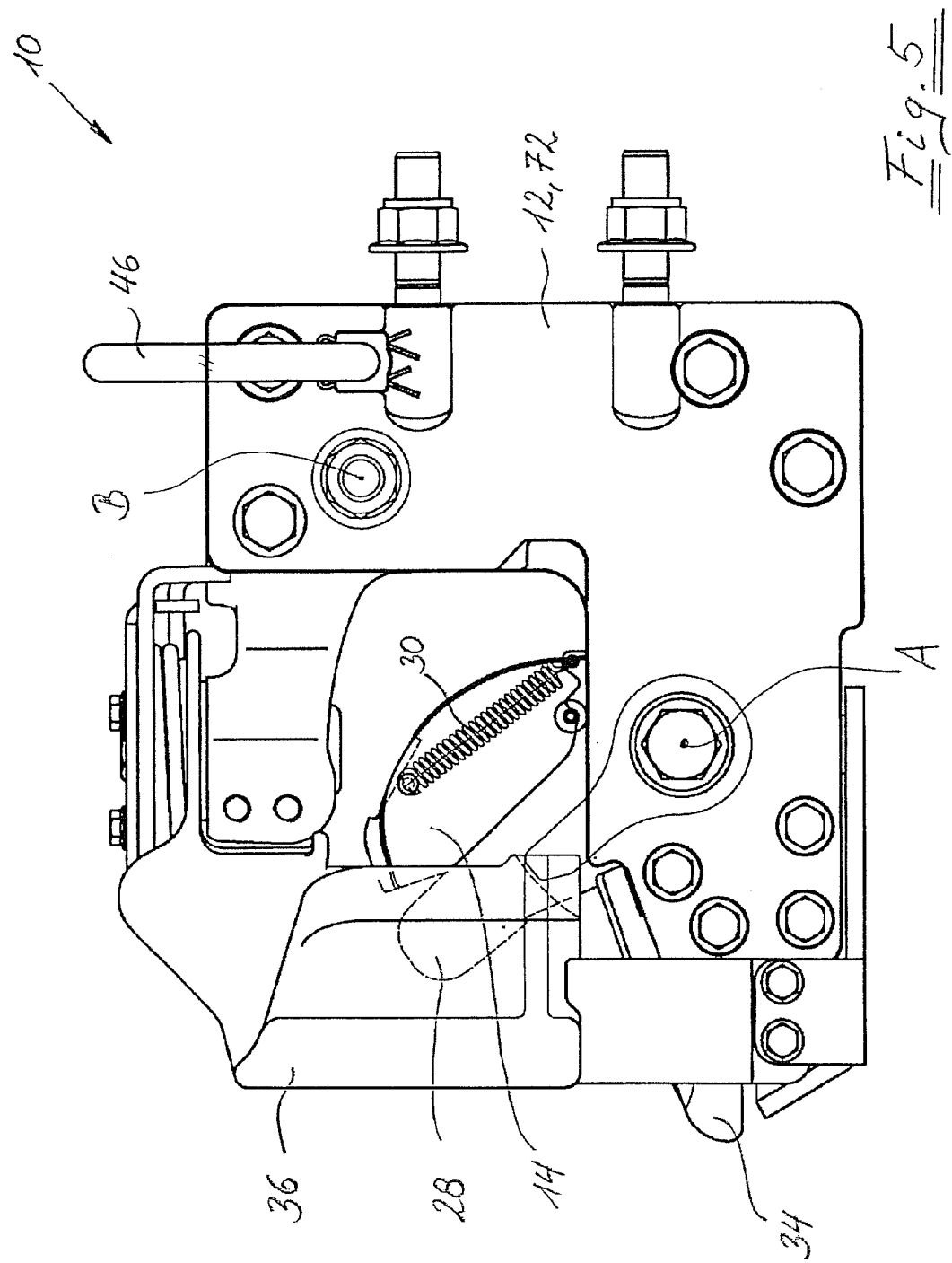

The invention is explained in more detail from an example with reference to the attached drawing. It depicts:

FIG. 1 A cut-away side view of a tow coupling that is the subject of the invention, in accordance with the coupling unit in the coupling position;

FIG. 2 A side view of the tow coupling, in accordance with FIG. 1, however, without the counter-coupling element;

FIG. 3 A cut-away side view of the tow coupling, in accordance with FIG. 1, in which the coupling unit is in the release position, and the counter-coupling element, in a deep position, moves toward the tow coupling;

FIG. 4 A cut-away side view similar to FIG. 3, whereby the coupling element moves toward to the tow coupling in a high position;

FIG. 5 A side-view of the tow coupling based on FIGS. 3 and 4, however, without a counter-coupling element, however with a locked trailer catch;

FIG. 6 A top view of the tow coupling that is the subject of the invention;

FIG. 7 A side view, taken against the travel direction of the towing vehicle, of the coupling element, and the elements attached to it; and FIG. 8a-8f Depictions for explanation purposes, of the setup and function of the securing device of the tow coupling according to the invention.

In FIG. 1, a tow coupling that is the subject of the invention is described in general with 10. The representation of FIG. 1 shows a side view of the tow coupling 10, whereby the "up-down" direction of the drawing level corresponds to of the high axis H of the tow coupling 10, the "right" direction of the drawing level corresponds to the travel direction F of the towing vehicle, i.e. the "left-right" direction of the drawing level corresponds to length axis L of the tow coupling 10, and the direction running orthogonally to the drawing level corresponds to transverse axis Q of the tow coupling 10.

On the base body 12 of the tow coupling 10, there is a coupling unit 14 supported around an axis A, extending essentially in the transverse direction Q so that it can swivel between a coupling position (see FIGS. 1 and 2) and a release position (see FIGS. 3, 4 and 5). The coupling unit 14 comprises a coupling element 16, in this case a spherical head, which is adapted and designed for working together with a counter-coupling element 18, in this case a ball socket. The ball socket 18 is part of a shaft 20 of a trailing vehicle 22, merely roughly schematically indicated in FIG. 1. In an analogous way, the tow coupling 10 is attached using a fastening bolt 24 to a towing vehicle 26, roughly drawn in FIG. 1.

The tow coupling 10 further comprises an entrainment element 28, that also is supported so that it can swivel around the swivel axis A. A tension spring 30 engages, with its one end below the swivel axis A onto the entrainment element 28, and with its other end, onto the coupling unit 14. The coupling unit 14 is L-shaped, whereby the spherical head 16 is attached on the free end of the L-bar 14a, and the engagement point of the tension spring 30 is positioned adjacent to the free end of the other L-bar 14b. In that way, the entrainment element 28 is, from the tension spring 30, when no other forces are working on the entrainment element 28, pulled with a shoulder 28a in position, against a stop pin 14c of the coupling unit 14.

The swivel axis A is, in addition, surrounded by a torsion spring 32, whose one end engages the base body 12, and whose other end engages the entrainment element 28. The torsion spring 32 is arranged such a way that it pre-tensions the entrainment element 28 in FIG. 1, counterclockwise. If the entrainment element 28 can follow that pre-tension, because no other forces are working on it, it is transmitted to the position represented in FIGS. 3 and 4, under the pre-tension of torsion spring 32, and takes, during this movement, due to the effects of the working together of the shoulder 28a with the stop pin 14c, the coupling unit 14 in its release position.

It should be mentioned that the entrainment element 28 has two side parts 28b and a bridge part 28c, which connect the two side parts, whereby it is rotatably supported with both side parts 28b, as shown in FIG. 7, on both sides of the coupling unit 14 on the swivel axis A. In the represented embodiment, the entrainment element 28 is manufactured as a stamped bending part made of metal sheet. As is roughly schematically represented in FIG. 1 with corrugation, the entrainment element 28 can be strengthened also by means of welded-on sheet metal elements, if necessary. The entrainment element 28 can however also be made as a forged part, or from a multitude of individual parts that are combined using for example screws, rivets, welds, etc.

At this point, it should be pointed out that each of the two side parts 28b of the entrainment element 28 are assigned to a separated spring 30. Correspondingly, the coupling unit 14 has on both, on its right side with respect to the drive direction F and also on its left side, an engagement point for a spring 30 and a stop pin 14c, and each of the side parts 28b has a stop 28a.

If the ball socket 18, as represented in FIG. 3, is moved in at a relatively deep position relative to tow coupling 10, it will contact, with its front end 18a against the surface 34a that runs diagonally upwards, of an access ramp. The ball socket 18 glides along that surface 24a, until it runs against the bridge part 28c of the entrainment element 28. In the further movement of the ball socket 18 into the housing body 12, the ball socket 18 entrains the entrainment element 28, and pivots it clockwise, around the axis A. As a result of that swivel movement, the spring 30 is tensioned, until the tension force is sufficient to entrain the coupling unit 14, i.e. also pivoting it clockwise around the axis A. If, in that movement, a situation should arise, which would lead in the tow coupling known from EP 1 586 469 A1 to a forced position between the coupling unit 14, in particular its spherical head 16, and the ball socket 18, in the tow coupling 10 according to the invention, the entrainment element 28 can continue to move, under the influence of the ball socket 18, whereby merely the spring 30 working between the entrainment element 28 and the coupling unit 14, will be tensioned tighter. If the "blockade" of the coupling unit 14 is removed by the continued movement of the ball socket 18, the coupling unit 14 will follow the entrainment element 28, in its swiveling movement.

From a predetermined swivel angle of the coupling unit 14 around the axis A, the spherical head 16 is moved so far into the ball socket 18, that the trailing end 18b of the ball socket 18 makes contact with the spherical head 16, and takes on the continued swiveling of the coupling unit 14. In that condition, the leading end 18a of the ball socket 18 gets out of contact with the entrainment element 28. In that manner, the coupling unit 14 ultimately attains the coupling position represented in FIG. 1.

If the ball socket 18, as represented in FIG. 4, is moved in a relatively high position relative to the housing body 12 toward the tow coupling 10, it will run, with its upper end 18c, up against the surface 36a that runs diagonally downwards, of the trailer catch 36 of the tow coupling 10. The ball socket 18 glides along that surface 36a until it makes contact with the entrainment element 28. However, the ball socket 18, in this case, does not make contact with the bridge part 28c of the entrainment element 28, but rather with the free ends of side parts 28b. If the ball socket 18 is not moved in the middle toward the tow coupling 10, but rather more in a side manner, it can even happen that the ball socket 18 only will make contact with the free end of one of the side parts 28b of the entrainment element 28. With regard to the further sequence of the approaching movement of the ball socket 18 to the tow coupling 10, the existing explanation of the coupling process, with the deep relative position of the ball socket 18 to the tow coupling 10, according to FIG. 3, can be referenced.

It should also be mentioned that the access ramp 34, at its end that protrudes into the housing body 12, in its middle, has a recess 34b that allows the spherical head 16 to be received in a space 12a of the housing body 12, provided below the access ramp 34 (see FIG. 3).

As represented in FIG. 1, the coupling unit 14 is held by a securing device 40, in its coupling position, and secured. The setup and function of that securing device 40 will be described in more detail in what follows, with reference to FIGS. 1 and 8a to 8e.

The securing device 40 comprises a securing element and/or a securing catch 42, which is supported on the housing body 12 so that it can swivel around an axis B which essentially extends in the transverse direction Q. The free end 42a of the securing catch 42 is in contact, when the coupling unit 14 is in its coupling position, with a contact surface 14d of the second L-bar 14b of the coupling unit 14. In that way, the securing catch 42 positively prevents the coupling unit 14 from moving out in an undesired manner by itself, from the coupling position. For purposes of completeness, it should be mentioned at this point that the securing catch 42, in that securing position, is received into the recess 28d, formed from both side parts 28b and the bridge part 28c of the entrainment element 28 (see FIG. 8a).

Figure 8C:
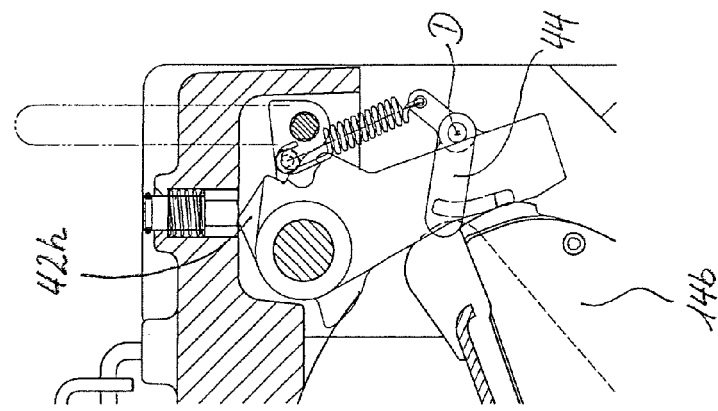
Figure 8B:
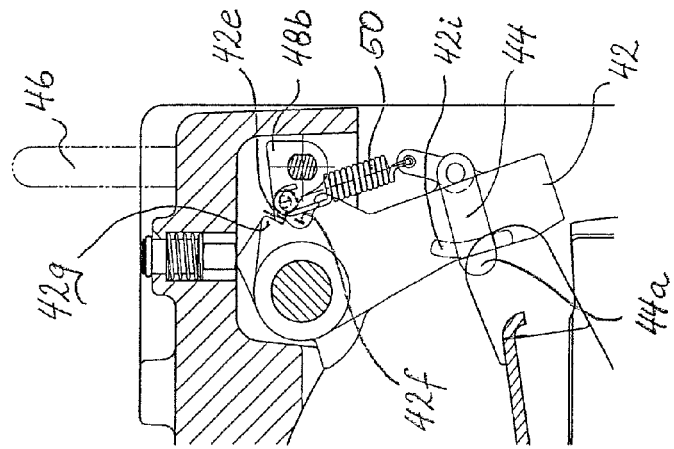
Figure 8A:
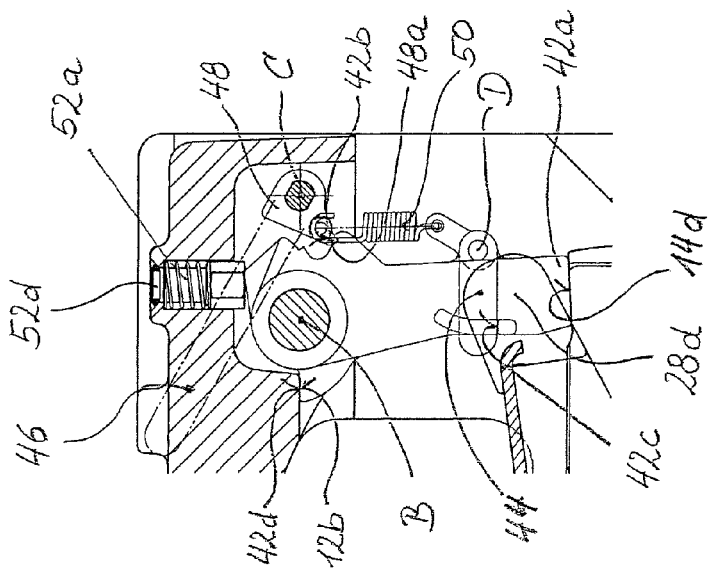

To be able to prevent the securing catch 42 from being accidentally and unintentionally moved from the securing position, in accordance with FIGS. 1 and 8a, a locking element and/or a locking key 48 is provided, which lies with a nose 48a against a first locking surface 42b of the securing catch 42. The securing position of the securing catch 42 is, in addition, determined by the mutual contact of a contact surface 42d of the securing catch 42 and of a contact surface 12b of the housing body 12.

The locking key 48 is connected to a manual catch 46 in such a way that the manual catch 46 is torque-proof with respect to locking key 48, but can swivel together with the locking key 48 around the axis C which extends substantially in the transverse direction. In addition, the locking key 48 is pre-tensioned using a spring 50, into this locking position. The spring 50 engages with its one end, at a position of the locking key 48, that is positioned between the swivel axis C and a nose 48a. With its other end, the spring 50 engages a triggering element, or latch element 44, which is supported on an axis D so that it can swivel, the axis D extending substantially in the transverse direction Q. That latch element 44 is pre-tensioned, under the effect of spring 50, against a stop 42c of the securing latch 42.

Now, if the trailing vehicle 22 shall be de-coupled from the towing vehicle 26, an operator will grasp the manual operating lever 46, and swivel it around axis C in the diagram in a clockwise direction, into the position represented in FIG. 8b. Due to that operation, the nose 48a of the locking key 48 will release the first locking surface 42b of the securing lever 42, and make contact with the control surface 42f, whereby the spring 50 secures the continuous contact of the control surface 42f and nose 48a. Through the common effect of the nose 48a and the control surface 42f working together, the securing lever 42 swings into its release position, in which it finds itself outside of the swivel path of the coupling unit 14. In this release position, the securing catch 42 will lie laterally against the nose 48a of the locking key 48, with a second locking surface 42e.

In order to prevent the locking key 48 from being unmeshed with the securing catch during pivoting of the manual operating lever 46, there is provided a protrusion 48b on the locking key 48, which makes contact with the housing body 12, and prevents an additional pivoting of the manual lever 46. In addition, the securing catch 42 of the second locking surface 42e, next to 42g, is set up at such a high position, that for the nose 48a of the locking key 48, there is always provided an opposing surface of the securing catch 42.

As can be recognized in FIGS. 8b and 8c, the latch element 44 protrudes with its free end 44a into the swivel path of the coupling unit 14, more precisely stated, of the second L-bar 14b of the coupling unit 14. In decoupling the trailing vehicle 22 and the resulting swiveling movement of the coupling unit 14, counter-clockwise around the axis A, the coupling unit 14 can deflect the latch element 44 from its contact position, against the force of the spring 50, and thus move past the latch element 44, without that having an influence on the position of the securing catch 42. The securing catch 42 remains in its release position, during that movement. If the coupling unit 14 has moved beyond latch element 44, the latch element 44 will return, under the pre-tension of spring 50, to its contact position. To keep the friction forces between the securing catch 42 and the latch element 44 as low as possible, the securing catch 42 has a slightly convexly formed, curved link 42i, on which the latch element 44 glides.

Figure 8F:
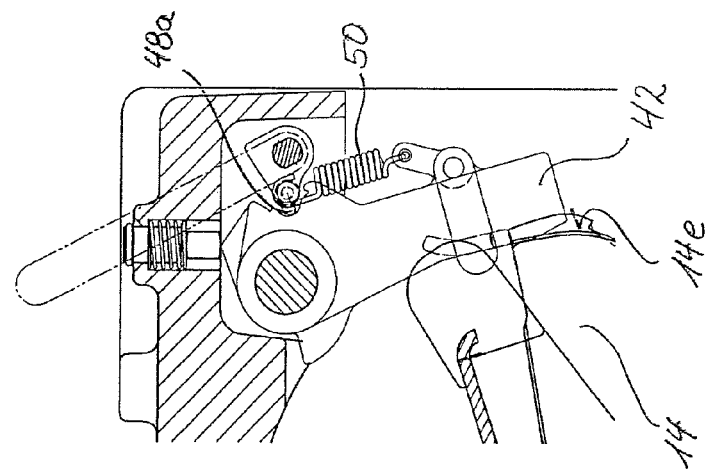
Figure 8E:
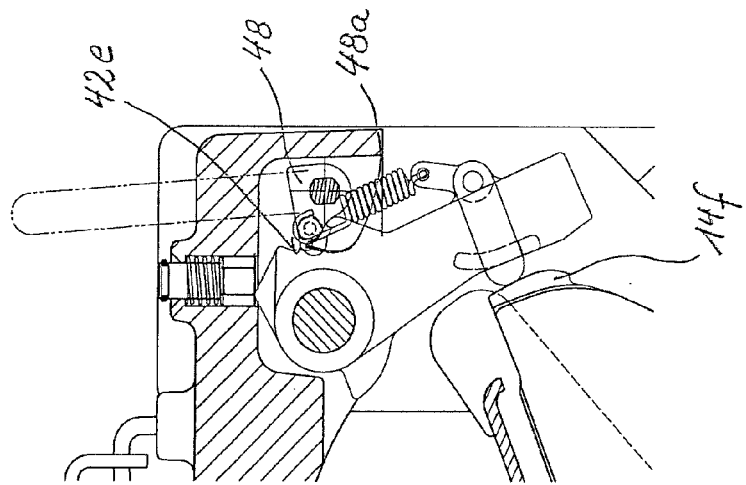
Figure 8D:
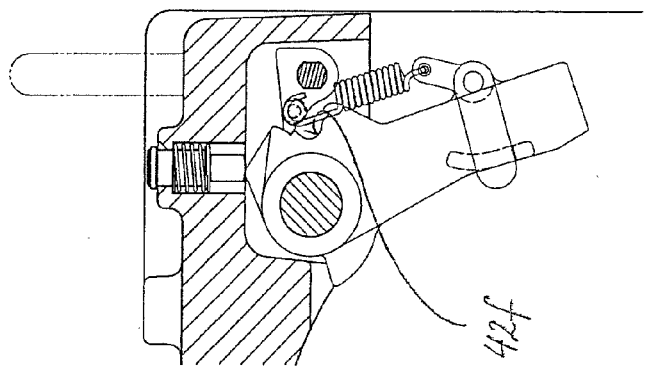

FIG. 8d shows the condition, as it is held. It corresponds to the decoupled condition, in which the tow coupling 10 simultaneously is available for the renewed coupling of a trailing vehicle 22.

If a trailing vehicle 22 is again attached, as this has been previously described with relation to FIGS. 3 and 4, the second L-bar 14b of the coupling unit 14 will move again into the area of the latch element 44. Because that is located in the contact position, and now cannot avoid a movement of coupling unit 14 clockwise, the latch element 44 remains in its position, so that the coupling unit 14 must not only swivel the latch element 44, but rather also with it, the entire securing catch 42 out of the way, as shown in FIG. 8e. In the course of that swinging of the securing catch 42, the nose 48a of the locking key 48 no longer meshes with the second locking surface 42e of the securing catch 42, and comes in contact with the control surface 42f of the securing catch 42. Under the influence of the spring 50, the nose 48a glides onto the control surface 42f and pivots, by doing that, the securing latch 42 clockwise.

So long as the coupling unit 14 is still in the area of the securing catch 42, the securing catch 42 lies against the face side 14e of the second L-bar 14b of the coupling unit 14, as is represented in FIG. 8f. If the coupling unit 14 has reached its coupling position, the securing catch 42 can swivel, past the coupling unit 14, again in contact with the contact surface 14d, so that again the condition of FIG. 8a results.

In accordance with what has been described above, only a single operation carried out with only one hand is needed by the operating personnel, specifically, swiveling the manual operation lever 46 from the position represented in FIG. 8a, into the position in FIG. 8b, in order to transfer the tow coupling 10 into the prepared condition for de-coupling the trailing vehicle 22. In addition, the trailing coupling 10 remains, after the decoupling of the trailing vehicle 22, in this position and is thus prepared to once more couple a trailing vehicle 22.

The coupling condition of the tow coupling 10 is displayed to the operating personnel, by a display device 52. That display device 52 can comprise, for example, a display pin 52a, that is received in a recess 52b of the housing body 12 and is pre-tensioned, using a spring 52c, into the recess 52b. The securing lever 42 has a protrusion 42h (see FIG. 8c), which has an effect on the display pin 52a, and, against the tension force of spring 52c, presses it out of recess 52b. Only then, when the upper end 52d of the display pin 52a is flush with the edge of the recess 52b, as that is represented in FIG. 8a, will the tow coupling 10 and/or its coupling unit 14 be in the coupled and secured condition.

It should be noted at this point, that the tow coupling 10 also can be set up in a remote controlled manner. As an example, the manual operating lever can be positioned at some distance from the tow coupling 10, and can have an effect, by means of a Bowden cable, on the shaft forming the swivel axis C and carrying the locking key 48. In addition, or as an alternative, it is also possible to replace the manual operating lever 46 by a motorized drive, for example an electromotor, a pneumatic unit and/or hydraulic unit, or something similar, which transfers the locking key 48 from the position shown in FIG. 8a, into the position shown in FIG. 8b. In all cases, the display device 52 can be replaced or supplemented by a sensor, that controls a corresponding display near a switch for operating the motor drive.

Further, it should be noted that the tow coupling 10 that is the subject of the invention, can have two separate securing devices 40. In that way, in the top view according to FIG. 6, one recognizes for example, both display devices 52 of both of those securing devices 40. Although that is preferred, the two securing devices 40 do not need to be completely separated from one another. It is rather possible that the latch element 44 is assigned to both securing devices 40, commonly. In that way, the pin that forms axis D can connect both securing catches 42, whereby the latch element 44 can be set up between both securing catches 42. In that case, on the front face 14e of the coupling unit 14, in the middle, a special nose 14f (see FIG. 8e) can be provided, for contact with the latch element 44. In addition, in this case, two springs 50 can be provided.

As can be recognized in FIG. 1 on the basis of dotdashed lines, the middle of the spherical head 16 is not exactly vertical over the swivel axis A of the coupling unit 14, but rather, is arranged with respect to the direction of motion, slightly behind the swivel axis A. Thereby, the horizontal distance X of the middle of the spherical head 16, from the swivel axis A, i.e. the distance of the projection, taken in the vertical direction, of the middle of the spherical head 16 in a horizontal level containing swivel axis A, from the swivel axis A, will amount to, at a maximum, 1/40 of the diameter of the spherical head 16, i.e. for a spherical head of 80 mm diameter, a maximum of 2 mm. In general, values of between 80 mm and 110 mm are usual for the diameter of the spherical head 16. Due to this design, the forces affecting the securing catch or securing catches 42 can be kept low. In particular, the dynamic vertical load of the ball socket 18 in the drive operation or its static support load in the standstill of the towing vehicle 26 and the trailing vehicle 22 is essentially completely introduced into the swivel axis A of the coupling unit 14, and does not need to be taken on by the securing catch 42.

In order to, on the other hand, make sure that the dynamic vertical load of the ball socket 18 in the drive operation or its static support load in the standstill of the towing vehicle 26 and the trailing vehicle 22 holds the coupling unit 14 continuously in contact at the securing lever 42, the relationship Y/X of the horizontal distance Y between the swivel axis A of coupling unit 14 and the middle of the contact surface 14d between the securing lever 42 and the coupling unit 14, may have with respect to the previously defined horizontal distance X of the middle of the spherical head 16, from the swivel axis A, a value of between about 25 and about 70. Because the middle of the spherical head 16 and the middle of the contact surface 14d are on different sides of the swivel axis A, the vertical load of the ball socket 18 continuously will attempt to pivot the coupling unit 14 out of the coupling position, toward the release position.

As is represented in FIG. 1, the tow coupling 10 has two balancing devices, specifically a balancing device 54 for balancing the vertical coupling play between the ball socket 18 and the spherical head 16, and a balancing device 56, for balancing the movement play of the coupling unit 14, in its coupling position.

The balancing device 54 is positioned in a recess 54a of the coupling housing 12 above that position, which the spherical head 16 takes in the coupling position of the coupling unit 14. The lengthening of the axis of the balancing device 54 runs thereby through the middle of the spherical head 16. In order to be able to define a set play securely, the recess 54a is slit, and two locking screws 54b are provided for narrowing the slit.

The trailer catch 36 is supported on the housing body 12 in such a way that it can swivel around an axis which extends in the height direction H. That axis runs—advantageously—through the middle of the spherical head 16, when the coupling unit 14 is in the coupling condition. For that reason, according to the invention, it is provided that the intake 54c of the housing body 12, which intake 54c forms the recess 54a of the balancing device 54, at the same time forms the upper swivel bearing for the trailer catch 36. In FIG. 1, the return spring 56 can also be recognized, which attempts to hold the trailer catch 36 in its middle position, which is directed against the drive direction F. In addition, in FIG. 1, also the lower swivel bearing 58 of the trailer catch 36 is represented. Put more precisely, the trailer catch 36 comprises an upper section 36a, which is rotatably supported on the intake 54c, and a lower section 36b, which is rotatably supported by means of the lower swivel bearing 58. Both sections 36a and 36b are connected to each other using two screw connections 36c.

In order to be able to prevent that the trailer catch 36, in the coupling-ready condition of the tow coupling 10 moves out of its central swivel position, the tow coupling 10 further comprises two locking levers 60, which engage the trailer catch 36 from behind, and which form fixation elements for the trailer 36 catch. Both locking levers 60 are also rotatably supported on the axis A, whereby they are connected through interlocking devices 60a, torque-free, with coupling unit 14 (see also FIG. 7). Those interlocking devices 60a are in the form of projections at cases 60b, which project laterally from the locking levers 60, which push through the side parts 28*b* of the entrainment element 28, and which are introduced into assigned recesses 14*g* of the coupling unit 14.

Through the torque-proof connection of the locking lever 60 with the coupling unit 14, the torsion spring 32 also pretenses the locking lever 60, and indeed, in the representation in FIG. 1, counterclockwise, i.e. to the trailer catch 36. In that way, the torsion spring 32 supports, by means of the engagement of the locking lever 60 on the trailer catch 36, the return spring 56 in its attempt to transfer the trailer coupling 36 into its central position. If the trailer coupling 36 has reached that central position, both locking levers 60 lie against the trailer coupling 36, under pre-tension through the torsion spring 32, and hold it in the central position.

It should be noted here that the housing body 12 of the tow coupling 10, according to the invention, does not need to be a forged part; rather, it can be made up of a multitude of housing plates. In that way, the housing body 12 comprises two lateral housing plates 70 and 72, on which the securing bolts 24 for securing the trailer coupling 10 on the towing vehicle 26 are attached (see also FIG. 6), and on which the access ramp 34 is attached, using two securing blots 34*c*. In addition, the housing body comprises an upper housing plate 74, in which the recess 52*b* for the indicating pin 52*a* of the display device 52 is formed, and which has the intake for the balancing device 54 for balancing the vertical coupling game, which also serves at the same time as the upper swivel bearing for the trailer catch 36. The upper housing plate 74 can be connected, according to the represented embodiment, using, for example, two screw bolts 74*a*, with both lateral housing plates 70, 72. Finally, the housing body 12 also comprises two lower housing plates 76 and 78. The rear lower housing plate 76 carries the swivel bearing 58 of the trailer catch 36, and can be connected to both lateral housing plates 70, 72, using for example two screw bolts 76*a*, while the front lower housing plate 78 supports the balancing device 56, for balancing out the movement play of the coupling unit 14, and can be connected to both lateral housing plates 70, 72 using for example two screw bolts 78*a*. To increase the transverse stability of the housing plate 12, one of the upper and lower housing plates 74, 76 and 78, in the represented embodiment, the front lower housing plate 78, can run diagonally upwards. However, it is fundamentally possible to form both lower housing plates 76 and 78 from one piece, as an individual housing plate.

In addition, for FIG. 7, it should be noted that the swivel axis A can be formed from a tube 80 that is inserted into the coupling unit 14, through an opening 14*h*, and which supports it in a freely rotatable manner. From outside the lateral housing plates 70, 72, the locking levers 60 with its casings 60*b* fit onto the tube 80. The entire assembly is held together by a screw bolt 82.

The invention claimed is:

1. A tow coupling for a towing vehicle, comprising:
    a base body;
    a coupling unit with a coupling element, the coupling element being configured to engage with a counter-coupling element of a trailing vehicle, the coupling element being configured to be adjusted relative to the base body between a coupling position and a release position; and
    a securing device with a securing element, the securing element being adjustable between a securing position and a release position, whereby the securing element secures it in its securing position the coupling element in its coupling position,
    wherein the securing element, in its release position, is configured to allow a transfer of the coupling element from its coupling position into its release position;
    wherein the securing element, in the course of the movement of the coupling element from the release position into the coupling position, is deflected by the coupling element from the release position, and is transferred into a securing position preparatory condition, and then, when the coupling unit has reached the coupling position, goes over into the securing position, on its own;
    wherein a triggering element is moveably supported on the securing element, the triggering element being pre-tensioned into a contact position; and
    wherein the triggering element is deflected from the contact position by the coupling unit during the coupling unit's movement from the coupling position into the release position, leaving the securing element in its release position, while the triggering element remains in the contact position relative to the securing element when there is a movement of the coupling unit from its release position into its coupling position, and the triggering element transfers the securing element into the securing position preparatory condition.

2. The tow coupling according to claim 1, wherein the securing device further comprises a locking element, which is adjustable between a locking position and an unlocking position;
    wherein the locking element holds the securing element in its securing position when the locking element is in its locking position, and the locking element transfers the securing element to its release position when adjusted into the unlocking position.

3. The tow coupling according to claim 2, wherein the locking element is caught, in its unlocking position, at the securing element.

4. The tow coupling according to claim 3, characterized in that a catch that catches the locking element is released in the transition of the securing element from its release position into the securing position preparatory condition.

5. The tow coupling according to claim 2, wherein the locking element is pre-tensioned into its locking position.

6. The tow coupling according to claim 2, wherein the locking element, during its adjustment into the locking position, transfers the securing element in its securing position.

7. The tow coupling according to claim 2, wherein the tow coupling further comprises a drive means, the drive means being configured to adjust the locking element from its locking position into its unlocking position.

8. The tow coupling according to claim 1, wherein the tow coupling further comprises a pre-tensioning device, the pre-tensioning device being configured to carry out at least two of the following functions:
    a) pre-tenses the triggering element in its contact position;
    b) pre-tenses the locking element into its locking position; and
    c) secures the engagement of locking element and securing element.

9. The tow coupling according to claim 1, wherein the securing element is rotatably supported on the base body, and the triggering element is rotatably supported on the securing element, and the locking element is rotatably supported on the base body.

10. The tow coupling according to claim 1, wherein a display device is provided, the display device being configured to show whether the securing element is in the securing position.

11. The tow coupling according to claim 10, wherein the display device comprises a display pin, which can be deflected by the securing element from a position in which the display pin shows that the securing element is in its securing position.

12. The tow coupling according to claim 10, wherein a sensor unit is assigned to the display device.

13. The tow coupling according to claim 1, wherein the tow coupling comprises two securing devices.

14. The tow coupling according to claim 1, wherein:
the tow coupling comprises two securing devices; and
the triggering element is assigned to the securing element of both securing devices, commonly.

15. The tow coupling according to claim 7, wherein the drive means is a manual lever.

16. The tow coupling according to claim 8, wherein the pre-tensioning device is a pre-loaded spring.

17. The tow coupling according to claim 1, wherein the securing element is rotatably supported on the base body.

18. The tow coupling according to claim 1, wherein the triggering element is rotatably supported on the securing element.

19. The tow coupling according to claim 1, wherein the locking element is rotatably supported on the base body.

20. A tow coupling for a towing vehicle, comprising:
a base body;
a coupling unit with a coupling element, the coupling element being configured to engage with a counter-coupling element of a trailing vehicle, the coupling element being configured to be adjusted relative to the base body between a coupling position and a release position; and
a securing device with a securing element, the securing element being adjustable between a securing position and a release position, whereby the securing element secures it in its securing position the coupling element in its coupling position,
wherein the securing element, in its release position, is configured to allow a transfer of the coupling element from its coupling position into its release position;
wherein the securing element, in the course of the movement of the coupling element from the release position into the coupling position, is deflected by the coupling element from the release position, and is transferred into a securing position preparatory condition, and then, when the coupling unit has reached the coupling position, goes over into the securing position, on its own;
wherein a triggering element is moveably supported on the securing element, the triggering element being pre-tensioned into a contact position; and
wherein the triggering element is deflected from the contact position by the coupling unit during the coupling unit's movement from the coupling position into the release position, leaving the securing element in its release position, while the triggering element remains in the contact position relative to the securing element when there is a movement of the coupling unit from its release position into its coupling position, and the triggering element transfers the securing element into the securing position preparatory condition.

21. A tow coupling for a towing vehicle, comprising:
a base body;
a coupling unit with a coupling element, the coupling element being configured to engage with a counter-coupling element of a trailing vehicle, the coupling element being configured to be adjusted relative to the base body between a coupling position and a release position; and
a securing device with a securing element, the securing element being adjustable between a securing position and a release position, whereby the securing element secures it in its securing position the coupling element in its coupling position,
wherein the securing element, in its release position, is configured to allow a transfer of the coupling element from its coupling position into its release position;
wherein the securing element, in the course of the movement of the coupling element from the release position into the coupling position, is deflected by the coupling element from the release position, and is transferred into a securing position preparatory condition, and then, when the coupling unit has reached the coupling position, goes over into the securing position, on its own;
wherein the securing device further comprises a locking element, which is adjustable between a locking position and an unlocking position; and
wherein the locking element holds the securing element in its securing position when the locking element is in its locking position, and the locking element transfers the securing element to its release position when adjusted into the unlocking position; and
wherein the locking element is caught, in its unlocking position, at the securing element.

22. A tow coupling for a towing vehicle, comprising:
a base body;
a coupling unit with a coupling element, the coupling element being configured to engage with a counter-coupling element of a trailing vehicle, the coupling element being configured to be adjusted relative to the base body between a coupling position and a release position; and
a securing device with a securing element, the securing element being adjustable between a securing position and a release position, whereby the securing element secures it in its securing position the coupling element in its coupling position,
wherein the securing element, in its release position, is configured to allow a transfer of the coupling element from its coupling position into its release position;
wherein the securing element, in the course of the movement of the coupling element from the release position into the coupling position, is deflected by the coupling element from the release position, and is transferred into a securing position preparatory condition, and then, when the coupling unit has reached the coupling position, goes over into the securing position, on its own;
wherein the securing device further comprises a locking element, which is adjustable between a locking position and an unlocking position;
wherein the locking element holds the securing element in its securing position when the locking element is in its locking position, and the locking element transfers the securing element to its release position when adjusted into the unlocking position; and
wherein the locking element is pre-tensioned into its locking position.

23. A tow coupling for a towing vehicle, comprising:
a base body;
a coupling unit with a coupling element, the coupling element being configured to engage with a counter-coupling element of a trailing vehicle, the coupling element being configured to be adjusted relative to the base body between a coupling position and a release position; and
a securing device with a securing element, the securing element being adjustable between a securing position and a release position, whereby the securing element secures it in its securing position the coupling element in its coupling position, wherein the securing element, in its release position, is configured to allow a transfer of the coupling element from its coupling position into its release position;

wherein the securing element, in the course of the movement of the coupling element from the release position into the coupling position, is deflected by the coupling element from the release position, and is transferred into a securing position preparatory condition, and then, when the coupling unit has reached the coupling position, goes over into the securing position, on its own;

wherein the securing device further comprises a locking element, which is adjustable between a locking position and an unlocking position;

wherein the locking element holds the securing element in its securing position when the locking element is in its locking position, and the locking element transfers the securing element to its release position when adjusted into the unlocking position; and wherein the tow coupling further comprises a drive means, the drive means being configured to adjust the locking element from its locking position into its unlocking position.

24. A tow coupling for a towing vehicle, comprising:

a base body;

a coupling unit with a coupling element, the coupling element being configured to engage with a counter-coupling element of a trailing vehicle, the coupling element being configured to be adjusted relative to the base body between a coupling position and a release position; and a securing device with a securing element, the securing element being adjustable between a securing position and a release position, whereby the securing element secures it in its securing position the coupling element in its coupling position, wherein the securing element, in its release position, is configured to allow a transfer of the coupling element from its coupling position into its release position;

wherein the securing element, in the course of the movement of the coupling element from the release position into the coupling position, is deflected by the coupling element from the release position, and is transferred into a securing position preparatory condition, and then, when the coupling unit has reached the coupling position, goes over into the securing position, on its own; and wherein a display device is provided, the display device being configured to show whether the securing element is in the securing position.

* * * * *